United States Patent
Shibata et al.

[15] 3,653,819
[45] Apr. 4, 1972

[54] PRODUCTION OF SODIUM CARBONATE

[72] Inventors: Hiroshi Shibata; Tomijiro Morita; Satoshi Nakano, all of Iwaki-shi, Japan

[73] Assignee: Kureha Kagaku Kogyo Kabushiki Kaisha, Tokyo-to, Japan

[22] Filed: Oct. 23, 1969

[21] Appl. No.: 871,420

Related U.S. Application Data

[63] Continuation-in-part of Ser. No. 580,338, Sept. 19, 1966, abandoned.

[30] Foreign Application Priority Data

Sept. 27, 1965  Japan....................................40/58863
Dec. 29, 1965  Japan....................................40/81318

[52] U.S. Cl....................................................23/63, 23/184
[51] Int. Cl. .........................................................C01d 7/00
[58] Field of Search........................23/63, 184; 204/87, 128

[56] References Cited

UNITED STATES PATENTS

| | | | |
|---|---|---|---|
| 2,083,648 | 6/1937 | Gorke | 23/184 |
| 2,133,455 | 10/1938 | Keene et al. | 23/63 |
| 3,019,082 | 1/1962 | Wygasch et al. | 23/184 |
| 3,103,413 | 9/1963 | Blumenthal | 23/63 |

*Primary Examiner*—Earl C. Thomas
*Assistant Examiner*—G. O. Peters
*Attorney*—Wenderoth, Lind & Ponack

[57] ABSTRACT

Process for producing sodium carbonate from the sodium amalgam of mercury-process salt electrolysis, wherein a caustic soda solution is reacted with carbon dioxide gas to produce sodium carbonate which is further subjected to crystallization and separation and a mother liquid resulted from the crystal separation is recirculated to a denuding device.

5 Claims, 1 Drawing Figure

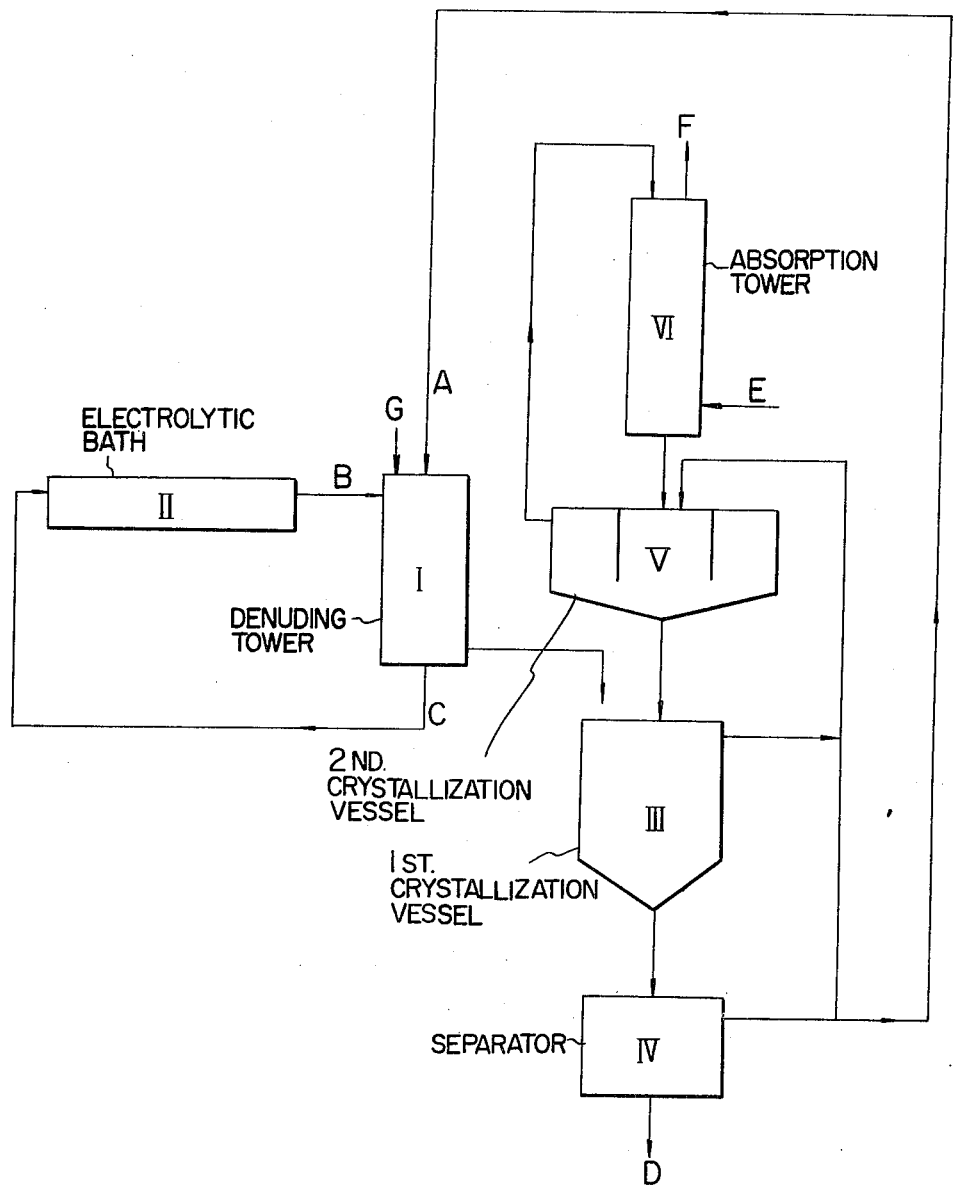

PRODUCTION OF SODIUM CARBONATE

REFERENCE TO RELATED APPLICATION

This is a continuation-in-part application of our copending patent application, Ser. No. 580,338, filed Sept. 19, 1966, entitled "Production of Sodium Carbonate and Sodium Sulphite", and now abandoned.

BACKGROUND OF INVENTION

This invention relates to a new and improved process for producing sodium carbonate from caustic soda (sodium hydroxide, NaOH) obtained from the mercury process electrolysis of common salt.

In order to overcome the unbalance in the demands for chloride and caustic soda accompanying the recent rapid development in the industries utilizing chlorine, intensive research is being carried forward on the production of sodium carbonate from caustic soda produced by electrolysis of common salt.

While it is well known that sodium carbonate and water can be produced by causing carbon dioxide or sulphur dioxide to act on an aqueous solution of caustic soda, in order to produce monohydrous or anhydrous sodium carbonate, or like compounds, it is necessary to remove all or most of the water component supplied in the aqueous solution of caustic soda and the water component formed by the reaction.

Moreover, since sodium carbonate, and like compounds are very low-priced chemicals, in cases where large quantities of heat energy are required to remove this water, this requirement immediately becomes a comparatively great factor in the production cost, which is thereby substantially increased. In the production of sodium carbonate, the ideal process is that wherein water other than that which can be evaporated and removed by the self-generated heat, such as the heat of formation of sodium carbonate and heat of dilution of caustic soda, is not supplied to the reaction process.

On the basis of this principle, the process described in the specification of U.S. Pat. No. 3,103,413 has been proposed. According to this process, caustic soda of a concentration of 63 percent or higher value obtained by the mercury-process electrolysis method is used to produce anhydrous sodium carbonate. However, the production of caustic soda of such high concentration by mercury-process electrolysis gives rise to a lowering of the efficiency of the denuding equipment and is highly disadvantageous in that denuding equipment of special construction is required.

Furthermore, since the solidifying point of caustic soda becomes 30° C. or lower when the concentration thereof exceeds 55 percent, it is necessary to maintain the caustic soda at a suitable temperature also during its transportation and storage. Consequently, in some cases, heat energy exceeding that saved in the sodium carbonate production process is required.

SUMMARY OF INVENTION

It is an object of the present invention to provide a process for producing sodium carbonate from the sodium amalgam of mercury-process salt electrolysis, in which process the above-described difficulties are overcome.

MOre specifically, an object of the invention is to provide an economical process of the above stated character, in which the only heat required from the outside is that for drying crystals of monohydrous or anhydrous sodium carbonate or anhydrous sodium sulphite.

Another object of the invention is to provide a process of the above stated character which, moreover, is relatively simple and can be carried out without special, expensive equipment.

The nature, principle, and details of the invention will be more clearly apparent from the following detailed description with respect to examples of preferred embodiment of the invention, when read in conjunction with the accompanying drawing.

BRIEF EXPLANATION OF DRAWING

In the drawing, single figure is a flow chart indicating one example of the process for producing sodium carbonate according to the present invention.

DETAILED DESCRIPTION OF INVENTION

By the practice of the present invention, it is not absolutely necessary to evaporate the water sent together with the caustic soda to the sodium carbonate formation process, it being possible to reuse this water as water added to the denuding equipment. Therefore, even when caustic soda of a concentration of approximately 50 percent obtained by ordinary mercury-process amalgam electrolysis is used, monohydrous or anhydrous sodium carbonate can be produced without the use of additional thermal energy.

The reaction whereby sodium carbonate is formed from caustic soda is a dehydration reaction as indicated by the following equation.

$$2NaOH + CO_2 \rightarrow Na_2CO_3 + H_2 \qquad 1.$$ 

Consequently, the water during the process is increased by the reaction. However, the denuding reaction is a hydration reaction as indicated by the following equation.

$$2Na + 2H_2O \rightarrow 2NaOH + H_2 \qquad 2.$$ 

Therefore, when these two reactions are combined in one recycling reaction process, as in the process of this invention, the resulting reaction becomes a hydration reaction as indicated by the following equation, whereby replenishment of water becomes necessary.

$$2Na + CO_2 + H_2O \rightarrow Na_2CO_3 + H_2 \qquad 3.$$ 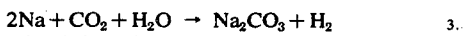

It is apparent that it is easier to add water than to evaporate water. Furthermore, in replenishing the water, it is possible to supply a suitable quantity of additional water for the purpose of preventing crystal precipitation within the denuding equipment, whereby the process control is facilitated.

Referring now to the drawing, water A containing caustic soda and 1 percent or less of sodium carbonate is supplied to a denuding tower I, and sodium amalgam B sent from an electrolytic cell II is also introduced into the denuding tower I to be denuded, whereby a caustic soda solution of high concentration is formed. The mercury C thus denuded is recirculated to the electrolytic cell II.

The denuding liquid is sent to a first crystallization vessel III and mixed with a sodium carbonate monohydrate in a slurry state which is sent from a second crystallization vessel V. The caustic soda concentration within the resultant mixture liquid is maintained at 28 percent or higher value, whereby the sodium carbonate is transformed into an anhydride. This slurry is sent to a separator IV, where anhydrous sodium carbonate D is separated out. Water adhering to the resulting crystals is dried off by a suitable method, whereupon the desired product is obtained.

The mother liquor from which the crystals have been separated in the separator IV is discharged into two return paths, one part of the mother liquor being sent to the second crystallization vessel V and mixed therein with a sodium carbonate solution arriving from an absorption tower VI thereby to cause precipitation of monohydrate crystals of sodium carbonate, whereby a slurry is formed.

The second crystallization vessel V, which is a crystallization sedimentation vessel of thickener type, concentrates the slurry, the concentrated slurry being sent to the first crystallization vessel III, and the supernatant liquid being sent to the absorption tower VI. An alternative method which may be used is that of providing separately a crystallization vessel and a separation vessel (or separator), separating slurry or crystals and clear mother liquor in the separating vessel (separator), and sending the same respectively to the first crystallization vessel III and the absorption tower VI.

The concentrated liquid sent to the absorption tower VI comes in contact with dilute carbon dioxide gas E, and the caustic soda in the liquid becomes sodium carbonate. At the same time, the liquid is concentrated by the heat of reaction, and water vapor is discharged through path F together with discharge gases.

The other part of the aforementioned mother liquor from the separator IV is reused as make-up water, and added to the denuding tower I together with the added water G.

In the above-described process, if the concentration of the sodium carbonate contained in the make-up water A to the denuding tower I becomes excessively greater than the saturation concentrations respectively of the inlet and outlet caustic soda, the sodium carbonate will precipitate out within the tower and cover denuded particles. As an undesirable result, the denuding efficiency will drop, and the tower will become clogged. Therefore, it is necessary to prevent the concentration of the inlet sodium carbonate from rising above 1 percent.

The concentrations of caustic soda and sodium carbonate in the make-up water A recirculated to the denuding tower I are automatically determined by values such as the caustic soda concentration in the first crystallization vessel III, the caustic soda concentration at the outlet of the denuding tower I, and the quantity of water evaporated during the process. These concentrations of the caustic soda and sodium carbonate in the make-up water A are 10 percent by weight or higher and 0.1 percent by weight or higher, respectively, in the case where caustic soda of concentration of 55 percent or less obtained from ordinary mercury-process alkali electrolysis is used.

The reasons for using the absorption tower VI, the second crystallization vessel V, and the first crystallization vessel III to crystallize anhydrous sodium carbonate in the example illustrated in the drawing are as follows.

A suitable concentration of the caustic soda recirculated to the absorption tower VI is from 10 to 20 percent by weight. If this concentration exceeds the upper limit of this range, there will be the possibility of crystallization of the sodium carbonate which has formed in the tower and clogging of the tower. Accordingly, it is advantageous to maintain the value of the caustic soda concentration in the solution within the second crystallization vessel V at 20 percent by weight or lower value, but, at this concentration, the sodium carbonate crystallizes as the monohydrate. Therefore, the first crystallization vessel III is further provided, and in this vessel the caustic soda concentration is maintained at 28 percent by weight or higher value, preferably at 33 percent by weight or higher level, to cause transformation of the monohydrate into an anhydride.

Since the caustic soda concentration within the first crystallization vessel III is high in this case, the quantity of sodium carbonate dissolved in the mother liquor becomes small, and, as convenient result, the quantity of sodium carbonate recirculated to the denuding tower I also becomes small.

The transformation of the sodium carbonate monohydrate into an anhydride is determined by the caustic soda concentration and temperature. Even in the case where the caustic soda concentration is 28 percent by weight or lower, transformation into an anhydride occurs when the temperature is high (i.e., approximately 75° C. or higher). On one hand, if the caustic soda concentration drops, the solubility of the sodium carbonate will increase, and in a solution containing 28 percent or less of caustic soda, the sodium carbonate solubility in the liquid, in which sodium carbonate anhydride is separated, becomes 5 percent by weight or higher.

Even if this solution is diluted with water such as water removed from the process and the water required for the formation of sodium amalgam, the sodium carbonate concentration in the water A added to the denuding tower I in most cases will exceed 1 percent and will exceed the solubility at the normal caustic soda concentration of 35 percent by weight or higher at the outlet of the denuding tower I. Consequently, precipitation within the tower will occur as mentioned above and give rise to various undesirable results. For this reason, it is necessary to maintain the caustic soda concentration of the solution which causes precipitation of sodium carbonate anhydride crystals at 28 percent or higher value, preferably at from 33 to 45 percent by weight.

However, combining of two or all of the absorption device, the second crystallization device, and the first crystallization device into one unit is not impossible. For example, by using a crystallization sedimentation vessel of thickener type for a crystallization device and blowing carbon dioxide gas into a portion of the supernatant liquid, it is possible to cause the single apparatus to function doubly as an absorption device and a crystallization device.

As another example, by using a spray tower and spraying from the top thereof the caustic soda sent from the denuding tower, while introducing carbon dioxide through the lower part of the tower, it is also possible to obtain an anhydrous sodium carbonate slurry in one step.

Furthermore, in the case where the monohydrate is desired, in general, the crystals formed within the crystallization vessel are separated, and, in the case where the caustic soda concentration of the separated mother liquor is low, and the sodium carbonate content is high, a caustic soda solution of even higher concentration is added thereto to raise the caustic soda concentration to 28 percent or higher value, preferably 33 percent or higher value, and the dissolved sodium carbonate is separated as monohydrous or anhydrous crystals, the resulting separated mother liquor being diluted suitably with water and recirculated to the denuding tower I.

However, by raising the concentration of the caustic soda in the crystallization vessel V and, at the same time, maintaining the temperature of this caustic soda below the temperature of transformation from a monohydrous to an anhydrous sodium carbonate at the caustic soda concentration within the vessel, it is also possible to obtain the monohydrate crystals in a single step in the concentrated caustic soda. Furthermore, in some cases, it is also possible after the initial separation of the anhydrous sodium carbonate in the first crystallization vessel, to convert said sodium carbonate into the monohydrate form in the dilute caustic soda or in the saturated sodium carbonate-aqueous solution.

In order to decrease the quantity of dissolved sodium carbonate in the first crystallization vessel, it is desirable to maintain the caustic sode concentration at 28 percent by weight or higher value, preferably from 35 to 45 percent by weight. However, as a method for lowering the concentration at equilibrium of sodium carbonate the method of causing small quantities of sodium salt such as common salt to coexist as third substances within the entire process system may be resorted to in place of or together with the expedient of using a high caustic soda concentration and, at the same time, lowering the temperature. While these third substances, themselves do not crystallize in any of the parts of the process system, it is observable that their presence has the effect particularly of lowering the equilibrium solubility of the sodium carbonate in the first crystallization vessel.

In the example as illustrated in the drawing, all of the newly added make-up water is introduced directly as added water for the denuding tower I. However, it is not absolutely necessary to introduce in this manner all of this make-up water as the added water, it being also possible to divide this make-up water into a number of portions and to introduce these portions into respective parts of the process where formation of crystals would be undesirable for the operation, thereby preventing crystallization at these parts by dilution.

PREFERRED EMBODIMENTS OF INVENTION

In order to indicate more fully the nature and utility of the invention, the following examples of practice thereof are set forth, it being understood that these examples are presented as illustrative only, and that they are not intended to limit the scope of the invention.

EXAMPLE 1

Production of anhydrous sodium carbonate was carried in accordance with the process indicated in the drawing in the following specific manner.

An aqueous solution (including 848 kg. of NaOH and 8 kg. of $Na_2CO_3$) was added continuously at a supply rate of 2,680 kg./hr. into the denuding tower I from the top thereof to accomplish contact denuding within the tower of 0.2 percent by weight sodium amalgam sent from the electrolytic cell II and containing 434 kg./hr. of sodium, whereby a 52 percent aqueous solution of caustic soda at a temperature of 80° C. containing 1,603 kg. (52.0 percent) of NaOH and 8 kg. (0.26 percent) of $Na_2CO_3$ was produced at a rate of 3,082 kg./hr. In this process, water evaporated at a rate of 13 kg./hr. as a result of formation of hydrogen within the tower.

The caustic soda solution sent from the denuding tower I was immediately introduced into the first crystallization vessel III and mixed with a suspension sent at a rate of 2,225 kg./hr. from the second crystallization vessel V and containing 981 kg. of $Na_2CO_3$ and 185 kg. of NaOH (a greater part (848 kg.) of the $Na_2CO_3$ being suspended as the monohydrate crystals), the temperature within the vessel III being maintained at 70° C. by blowing air thereinto. Water evaporated in this vessel III at a rate of 34 kg./hr., and all of the $Na_2CO_3$ sent from the second crystallization vessel V was transformed into anydrous crystals.

The anhydrous sodium carbonate formed in the first crystallization vessel III was separated in the separator IV to produce crystals containing 973 kg./hr. of $Na_2CO_3$. Since 5 percent of mother liquor of the transformation vessel still adhered to these crystals and contained approximately 21 kg. of NaOH, these crystals were dried in a stream of hot air containing carbon dioxide gas, whereupon 1,000 kg. of anhydrous sodium carbonate was obtained.

As the mother liquor, from which the crystals were separated in the separator IV, a solution containing 1,767 kg. (41.7 percent) of NaOH and 16 kg. (0.38 percent) of $Na_2CO_3$ was obtained at a rate of 4,254 kg./hr. This solution was divided into two portions, and one portion at a flowrate of 2,040 kg./hr. (containing 848 kg. of NaOH and 8 kg. of $Na_2CO_3$) was recirculated as added water A to the denuding tower I. During the same time, 640 kg./hr. of water was supplied to the denuding tower I. The remaining 2,214 kg./hr. (containing 919 kg. of NaOH and 8.3 kg. of $Na_2CO_3$) of the above stated solution was sent to the second crystallization vessel V.

For the second crystallization vessel V, a continuous sedimentation vessel of the thickener type capable of accomplishing the function of mixing a saturated solution of sodium carbonate from the absorption tower VI and an approximately 40 percent solution of caustic soda from the first crystallization vessel III and causing sodium carbonate to settle partly as the monohydate crystals, the function of accumulating and concentrating the settled crystals at the central part of the vessel, and the function of clarifying the surrounding peripheral liquid was used.

When a sodium carbonate solution sent from the absorption tower VI at a rate of 5,011 kg./hr. (containing 1,501 kg. of $Na_2CO_3$) and a cleared liquid from the first crystallization vessel at a rate of 1,025 kg./hr. which results from the filtrate in the separator IV produced at a rate of 2,214 kg./hr. were mixed at the upper central part of the second crystallization vessel V, 993 kg./hr. of sodium carbonate in the mixed liquid was settled as monohydrate. The concentration of the mother liquid within the second crystallization vessel V was maintained at 15 percent by weight of NaOH and 10.8 percent by weight of $Na_2CO_3$. The settled crystals were collected at a lower central discharge outlet and then sent to the first crystallization vessel III. The interior of the vessel V was maintained at a temperature of 70° C. by blowing air thereinto and causing 110 kg. of water to be evaporated.

From the outer clarification part of the second crystallization vessel V, an aqueous solution containing 734 kg. of NaOH and 530 kg. of $Na_2CO_3$ was drawn out at a rate of 3,893 kg./hr. and transferred to the absorption tower IV, where this solution was caused to undergo contact reaction with waste gas of combustion containing approximately 10 percent by volume of carbon dioxide and thereby to absorb the carbon dioxide at a rate of 404 kg./hr. At the same time, 285 kg./hr. of water was evaporated together with the waste gas. This absorption liquid was sent to the second crystallization vessel V. The solution thus formed and containing 1,501 kg./hr. of $Na_2CO_3$ was recirculated to the second crystallization vessel V as mentioned hereinabove.

Throughout the above-described process the only heat supplied from the outside was the heat of the combustion gas used for drying anhydrous sodium carbonate. (The waste gas of combustion used in the absorption tower VI was thus used after being washed with water to remove soot and cooled to room temperature.)

EXAMPLE 2

Production of anhydrous sodium carbonate was carried out in accordance with a procedure which differed from that set forth in Example 1 only in the elimination of the absorption tower VI, the blowing of waste gas of combustion containing approximately 10 percent (by volume) of $CO_2$ into the clarification part of second crystallization vessel V to cause absorption of 404 kg. of $CO_2$, and the evaporation of 412 kg. of water within the second crystallization vessel V.

In this case, the liquid which had absorbed the $CO_2$ at the outer peripheral part of the vessel V was circulated to the central part of the vessel V and there mixed with 2,265 kg. of a solution (containing 40.9 percent of NaOH and 0.4 percent of $Na_2CO_3$) sent from the first crystallization vessel III, whereby the monohydrate crystals were separated. In all other respects, the process could be carried exactly as set forth in Example 1, and 1,000 kg. of anhydride crystals were obtained.

EXAMPLE 3

A single reaction vessel adapted to accomplish the functions of an absorption tower, a crystallization vessel, and a transformation vessel was used. Into this reaction vessel, a caustic soda solution containing 208.6 kg. (50.0 percent) of NaOH and 1.1 kg. (0.26 percent) of $Na_2CO_3$ was supplied continuously at a solution temperature of 95° C. and at a rate of 417.2 kg./hr. At the same time, waste gas of combustion was blown into the vessel to cause $CO_2$ to be absorbed at a rate of 40.4 kg./hr.

In order to prevent adhesion of scale due to formed $Na_2CO_3$ on the parts where the $CO_2$ gas was blown in, a soft rubber tube was secured onto the tip of the pipe blowing in the $CO_2$ gas thereby to cause the crystals separated at the tip to be peeled off by the vibration due to the blowing action.

Anhydrous sodium carbonate crystals immediately formed within the reaction vessel and were treated in the same manner as set forth in Example 1, whereby 100 kg./hr. of anhydrous sodium carbonate crystals were obtained.

As the mother liquor, from which the crystals were separated, 306.7 kg./hr. of a solution containing 133.1 kg. (43.4 percent) of NaOH and 1.1 kg. (0.36 percent) of $Na_2CO_3$ was obtained. This solution was diluted with 70.3 kg./hr. of water and introduced into the denuding tower I, and a caustic acid solution of the composition for charging the reaction vessel was obtained. In this manner, the process was caused to undergo continuous recycles of operation.

During this process, the rates of water evaporation in the reaction vessel and the denuding tower were 49.1 kg./hr. and 1.3 kg./hr., respectively.

EXAMPLE 4

4,895 kg./hr. of a solution (containing 734 kg. of NaOH and 532 kg. of $Na_2CO_3$) was extracted from the clarification part of the crystallization vessel V and supplied to a charging tower of 800 mm. in diameter and 7 m. in charging height. In this charging tower, the liquid was placed in contact with a waste gas of combustion containing approximately 10 percent by volume of $CO_2$ and caused to absorb 415 kg./hr. of $CO_2$, whereby 5,004 kg./hr. of sodium carbonate solution containing 1,532 kg. of $Na_2CO_3$ was obtained.

This solution was divided into two portions of approximately equal flowrates, one portion being immediately sent to the crystallization vessel V, the other portion being used for washing anhydride crystals as described hereinafter, and the wash liquid thereafter being recirculated to the crystallization vessel V. In the crystallization vessel V, the above mentioned solution was mixed with 2,139 kg./hr. of a solution sent from the separator IV and containing 875 kg. of NaOH and 10 kg. of $Na_2CO_3$, and 878 kg. of $Na_2CO_3$ was settled out as the monohydrate.

1,301 kg./hr. of a slurry containing 973 kg. of $Na_2CO_3$ and 141 kg. of NaOH was sent from the crystallization vessel V to the transformation vessel III and mixed therein with 2,934 kg./hr. of a caustic soda solution sent from the denuding tower I and containing 1,466 kg. (50.0 percent) of NaOH and 8 kg. (0.27 percent) of $Na_2CO_3$, whereby all of the $Na_2CO_3$ in the slurry was precipitated as anhydride crystals.

The precipitated crystals were separated in the separator IV, and the remaining mother liquor containing 711 kg. of NaOH and 8 kg. of $Na_2CO_3$ was diluted with 795 kg./hr. of water and recirculated to the denuding tower I. The separated anhydride crystals were washed with one-half of the sodium carbonate solution formed in the absorption tower VI. During this washing, the anhydrous sodium carbonate was hydrated and reverted to the form of monohydrate crystals.

The monohydrate was dried at a temperature below 100° c, and 1,000 kg. (computed in terms of $Na_2CO_3$) of sodium carbonate monohydrate crystals were obtained.

During the above-described process, 305 kg., 73 kg., and 13 kg. of water were evaporated respectively in the abosorption tower VI, the crystallization vessel V, and the denuding tower I. Furthermore, 233 kg. of water was removed as constitution water and adhering water of the sodium carbonate monohydride crystals.

What we claim is:

1. A process for producing sodium carbonate from the sodium amalgam of mercury-process salt electrolysis, comprising: using a solution containing 28 to 45 percent by weight of caustic soda and a small quantity of sodium carbonate as make-up water for denuding device for mercury-process salt electrolysis, thereby causing denuding of the sodium amalgam of said electrolysis and formation of a caustic solution; causing said caustic soda solution to react with carbon dioxide gas thereby to form a sodium carbonate solution from one portion of said caustic soda solution; converting said sodium carbonate in the thus formed solution into monohydrous crystals thereof and separating out said crystals; recirculating the resulting mother liquor remaining after separation of said crystals and containing caustic soda and a small quantity of sodium carbonate to the denuding device as make-up water; and adding sufficient water to control the effluent of the denuding zone at 50 to 55 percent caustic by weight.

2. A process for producing sodium carbonate from the sodium amalgam of mercury-process salt electrolysis, comprising: using a solution containing 28 to 45 percent by weight of caustic soda and a small quantity of sodium carbonate as make-up water for a denuding device for mercury-process salt electrolysis, thereby causing denuding of the sodium amalgam of said electrolysis and formation of a caustic soda solution causing said caustic soda solution to react with carbon dioxide gas thereby to form a sodium cerbonate solution from one portion of said cautic soda solution; converting said sodium carbonate in the thus formed solution into anhydrous crystals thereof and separating out said crystals; recirculating the resulting mother liquor remaining after separation of said crystals and containing caustic soda and a small quantity of sodium carbonate to the denuding device as make-up water; and adding sufficient water to control the effluent of the denuding zone at 50 to 55 percent caustic by weight.

3. Process for producing sodium carbonate as claimed in claim 1, in which the process steps are accomplished in a continuous manner.

4. Process for producing sodium carbonate as claimed in claim 2, in which the process steps are accomplished in a continuous manner.

5. Process for producing sodium carbonate as claimed in claim 1, wherein the caustic soda concentration of the recirculating mother liquor is between 28 to 45 percent by weight and sodium bicarbonate concentration of the total added water for denuding device is between 0.1 to 1 percent by weight.

* * * * *